Nov. 27, 1923.

A. G. SCHNEIDER

GAS HEATER

Filed Aug. 28, 1922

1,475,450

INVENTOR.
Augustus G. Schneider
BY Westall and Wallace
ATTORNEYS.

Patented Nov. 27, 1923.

1,475,450

UNITED STATES PATENT OFFICE.

AUGUSTUS G. SCHNEIDER, OF ARLINGTON, CALIFORNIA.

GAS HEATER.

Application filed August 28, 1922. Serial No. 584,677.

*To all whom it may concern:*

Be it known that I, AUGUSTUS G. SCHNEIDER, a citizen of the United States, and resident of Arlington, in the county of Riverside, State of California, have invented new and useful Improvements in a Gas Heater, of which the following is a specification.

This invention relates to a gas heater having radiating elements, and pertains particularly to a heater having a burner enclosed within a radiating element.

The primary object of this invention is to provide a heater having the burner flame distributed over a large area of the radiating elements, and the latter of such form as to offer a large radiating surface for diffusing heat. In addition to the broader objects of this invention, there are certain details of design whereby a simple, compact, and durable heater is obtained.

Figure 1:
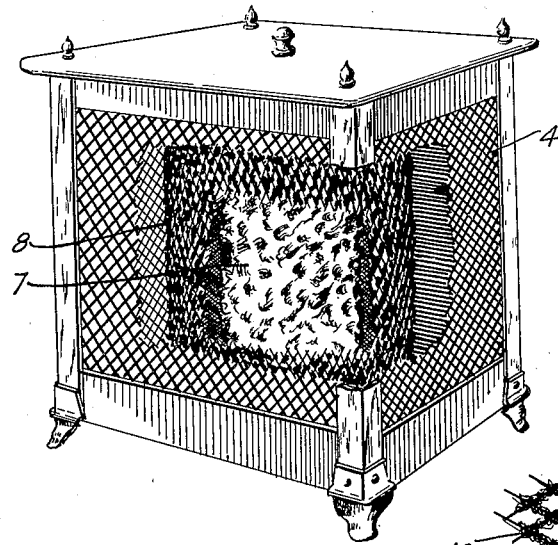
Figure 3:
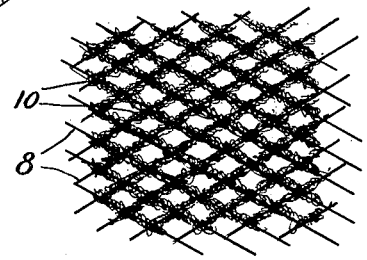
Figure 2:
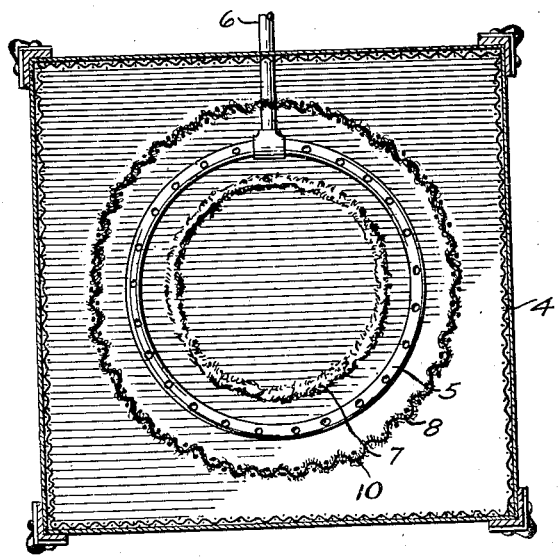

These objects together with other objects and corresponding accomplishments are obtained by means of the embodiment of my invention illustrated in the accompanying drawing, in which:

Fig. 1 is a perspective view of a complete heater embodying one form of my invention; Fig. 2 is a sectional plan view through the structure shown in Fig. 1; and Fig. 3 is a sectional fragment of the outer cylinder.

Referring more particularly to Figs. 1 and 2, an open housing or frame is indicated by 4. The particular type of housing is not material to the present invention. It is sufficient that it does not obstruct the radiation of or the circulation of heated air. Disposed in the bottom of the heater is a circular burner 5 fed with gas from a supply pipe 6. Disposed within the burner is a cylinder 7 which may be imperforate and covered with a heat radiating material such as shredded asbestos. It is not essential that the cylinder be imperforate or that the radiating material be asbestos. The cylinder should serve as a back. Surrounding the burner is a perforate cylinder 8. The outer cylinder is preferably reticulated material and coated with plastic material 10 without closing the openings in the reticulated material.

The structure is such that the burner is housed between two radiating walls. This offers a large surface over which the heat of the flame is diffused and a large radiating surface. Furthermore, the heat is radiated in every direction and the flame is fully housed so as to transfer the heat through the radiating material. The latter becomes incandescent and a highly efficient heater is produced.

What I claim is:

A heater including a columnar radiating back covered with shredded asbestos, an outer reticulated front enveloping said back and spaced therefrom and coated with plastic material without closing the openings in the reticulated material, and an annular burner housed in the space between said back and front.

In witness that I claim the foregoing I have hereunto subscribed my name this eighteenth day of August, 1922.

AUGUSTUS G. SCHNEIDER.